United States Patent

[11] 3,619,584

| [72] | Inventors | Edward O. Gilbert;<br>Garnel F. Graber, both of Ann Arbor, Mich. |
|---|---|---|
| [21] | Appl. No. | 865,780 |
| [22] | Filed | Oct. 13, 1969 |
| [45] | Patented | Nov. 9, 1971 |
| [73] | Assignee | Reliance Electric Company |

[54] COMPUTER PROBLEM SETUP TESTING SYSTEM
10 Claims, 5 Drawing Figs.

[52] U.S. Cl. ................................................. 235/153,
235/183, 235/184, 324/73, 328/151
[51] Int. Cl. ...................................................... G01r 15/00,
G06g 7/00
[50] Field of Search ........................................... 235/153,
183, 184, 150.51; 324/73; 127/151; 307/229, 230

[56] References Cited
UNITED STATES PATENTS

| 2,961,607 | 11/1960 | Hunt | 324/73 |
| 2,967,997 | 1/1961 | McCoy | 324/73 |
| 2,977,534 | 3/1961 | Hermansdorfer et al. | 324/73 |
| 3,330,948 | 7/1967 | Single | 235/184 |
| 3,476,924 | 11/1969 | Conger | 235/183 |
| 3,503,049 | 3/1970 | Gilbert et al. | 328/151 X |

Primary Examiner—Charles E. Atkinson
Attorney—Richard G. Stephens

ABSTRACT: The method and apparatus for checking the connections and adjustments of an analog computer involves switching all integrators to a reset or initial condition mode, and then monitoring the output voltages of the integrators in succession. As the output voltage of a given integrator is monitored, the given integrator is connected to receive its integrand inputs and converted into a lag summer by connecting a resistor in parallel with the integrator capacitor, so that the output voltage changes from the initial condition value to a final steady-state value which may be precalculated. Observation of the change of the output voltage provides both static and dynamic testing. Since amplifier summing junction currents need not be monitored, the amplifier addressing structure may be much less expensive.

INVENTORS.
EDWARD O. GILBERT
GARNEL F. GRABER

COMPUTER PROBLEM SETUP TESTING SYSTEM

General-purpose analog and hybrid analog-digital computers commonly include a variety of computing elements (e.g. integrators, summers, multipliers, function generators, potentiometers) and a selective connection means, such as a patchboard, by means of which various of the computing elements may be interconnected in order to solve a desired problem. The setting-up of a problem involves not only interconnecting various of the computing elements, but also adjusting potentiometers and the like to provide desired coefficient values and to provide desired initial conditions to the integrators involved in the problem. A complex problem may require a rather large number (e.g. several hundred) of patchboard connections to be made and several dozen adjustments to be made by the operator, and because human fallibility frequently results in some wrong connections, various schemes have been devised to allow the operator to check the problem setup on a patchboard before a problem solution is run on the computer.

A number of the prior art testing schemes are disadvantageous in that they require expensive additional equipment and extra wiring. Also, in order to provide substantially complete checking of a problem setup, some prior art computers have required both a means for providing a static check and further apparatus for providing a dynamic check. Descriptions of various prior art testing schemes are contained in "Electronic Analog and Hybrid Computers" by Korn and Korn (McGraw-Hill, New York, 1964) at pages 452–453. The present invention is advantageous in that it may be incorporated into a computer at comparatively little expense, and further advantageous in that a single very inexpensive testing system provides all of the advantages of the prior art static checks and many of the advantages of prior art dynamic checks. Accordingly, it is a primary object of the present invention to provide improved computer problem setup testing method and apparatus which may be implemented at very little expense. It is another object of the invention to provide improved computer problem setup testing method and apparatus in which a single test provides much of the information heretofore obtained only by separate static and dynamic tests.

Other objects of the invention will in part be obvious and will, in part, appear hereinafter.

The invention accordingly comprises the features of construction, combination of elements, and arrangements of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
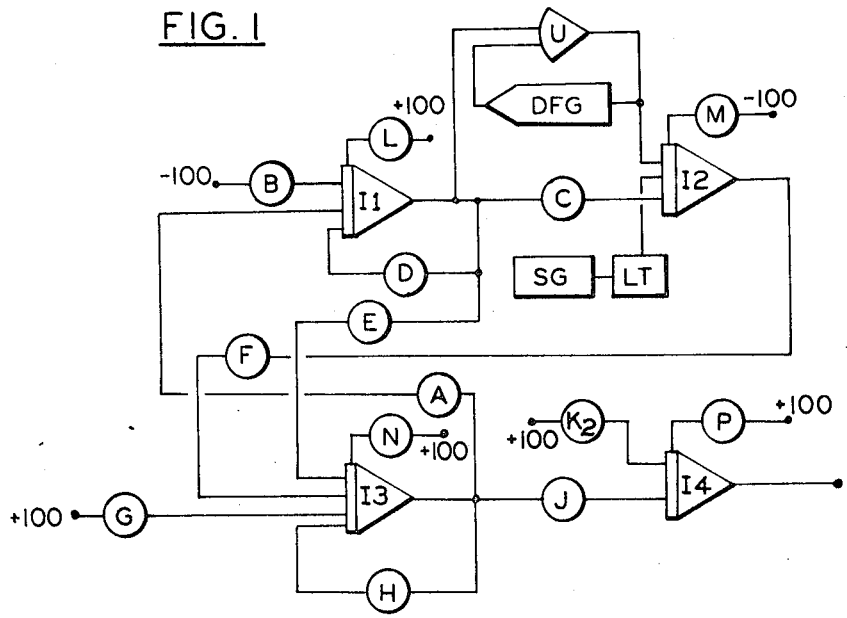
FIG. 1 is an analog computer block diagram of a hypothetical problem.

FIG. 1 illustrates a hypothetical problem which is set up using four electronic integrators I1 through I4, a plurality of coefficient devices such as DAC's or potentiometers A, B, C, D, E, F, G, H, J, $K_2$, four potentiometers L, M, N, P for applying initial condition potentials to the four integrators, a summing amplifier U, and a diode function generator DFG. The standard scaling resistors ordinarily used at the integrator and other amplifier input circuits are not shown. The potentiometer terminals shown unconnected are each assumed to be connected to a positive or a negative reference voltage as indicated by plus or minus signs. Any problem of significant complexity has a plurality of signal loops which are closed when the problem is running. While a number of closed loops exist within various of the components shown in FIG. 1, the term "loop" is used herein to mean the loops which are formed externally of the components by interconnecting the components, by means of a patchboard or an equivalent interconnection system, and a computing component such as an integrator is described as being connected in a loop if it is so connected during all or a portion of the time when the computer is switched into its "operate" mode to provide a problem solution. A variety of different types of such external loops are shown in FIG. 1, which has been drawn to illustrate a variety of different typical loop circuits rather than to depict an actual problem. A signal loop which includes a single integrator may be termed a first order loop, one which includes two integrators in succession a second order loop, etc., and a loop which does not include any integrator may be termed a zero order loop. In FIG. 1 integrator I1 and potentiometer D will be seen to comprise one first order loop, and integrator I3 and potentiometer H comprise another first order loop. While each of the two mentioned first order loops is shown as including a single potentiometer connected between an integrator output and input terminal, the loop often may include many additional components. A second order loop will be seen to include integrator I1, potentiometer E, integrator I3 and potentiometer A back to integrator I1. A third order loop will be seen to include integrator I2, potentiometer F, integrator I3, potentiometer A, integrator I1 and potentiometer C back to integrator I2. Amplifier U and function generator DFG will be seen to form a zero order loop. In complex problems, such as three-axis flight simulation, it is ordinarily possible to trace loops of even higher than third order. As well as the mentioned loops, most problems involve various components which are not connected in closed loops but rather in open-ended "branches." Potentiometer J and integrator I4 will be seen to comprise an output branch in FIG. 1, while sine wave generator SG and limiter circuit LT comprise an input branch.

Figure 2A:
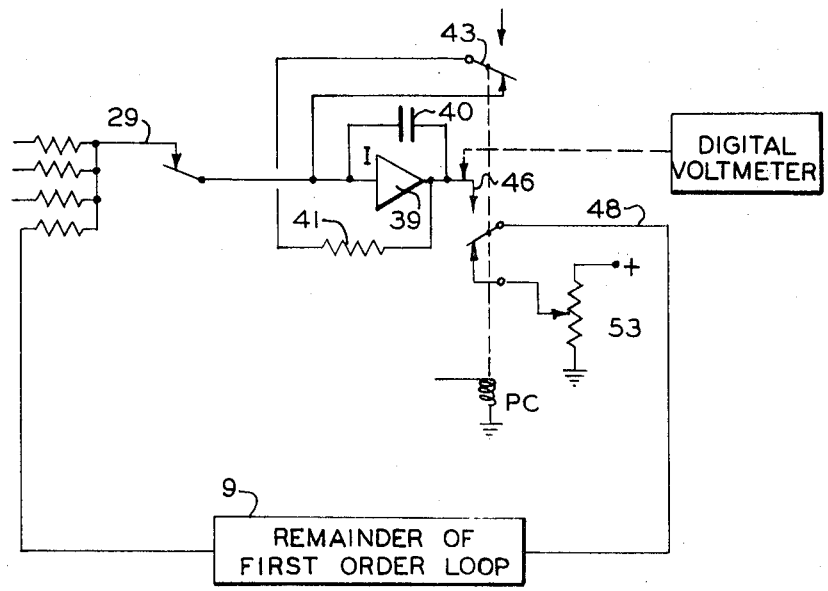
FIG. 2a is a schematic diagram illustrating the configuration of each integrator and its connection to a measuring instrument in one prior art testing system when a static check is being performed.

The time-honored techniques utilized since World War II for checking electronic analog computers have uniformly involved opening all of the integrator loops, i.e., first order and higher order loops, by disabling or placing each integrator in a fixed or steady standby mode wherein its output will not change. If all of the integrators in the problem are switched to such a mode, such as by opening each integrator circuit at its signal input terminal, all of the integrator loops are opened, and the problem is converted from one involving a number of interconnected loops into one involving a multiplicity of largely independent branches. If the integrators are all switched to their IC or reset mode, each branch which extends from an integrator output terminal is excited by the integrator initial condition voltage, and measurements made at various terminals along those branches indicate whether they are properly connected and adjusted. Such an elementary system obviously does not test the integrator input connections, however, or allow the test of branches connected to integrators having a zero initial condition. To provide more complete testing, the systems used with the earliest large-scale electronic analog computers included disabling of the integrators, the provision of known and fixed nonzero voltages at integrator outputs, and measurement of the resulting integrator input signals translated back through first order loops to the integrator input circuits, and measurement of various signals along various branches, in conformance with usual signal-tracing techniques. The prior art technique of this type illustrated in FIG. 2a uses a relay PC to open the output circuit of each integrator and substitute a known voltage from a potentiometer 53, and to disable each integrator by converting each integrator to a summing or inverting amplifier, using a further contact 43 on relay PC to connect a resistor 41 in parallel with the integrator capacitor 40 to disable the integrator. FIG. 2a illustrates the configuration into which all integrators of a problem are switched during this particular prior art testing mode, which is further described in U.S. Pat. No. 2,967,997 to McCoy. All of the integrators remain in the standby mode or condition shown in FIG. 2a as the outputs of the various integrators are measured, with each integrator providing a constant or fixed output voltage. If a first order loop exists around the integrator I, as shown by a block 9 in FIG. 2a, it will be seen that the known voltage from potentiometer 53 will pass through the remainder of the first order loop and provide or contribute to an output voltage appearing at the integrator I output terminal 46, where it may be measured using a digital voltmeter, for example. If the only loops around integrator I are second order or higher order, it will be apparent that the known voltage from potentiometer 53 will pass to the next succeeding integrator, but then will stop there and not affect in any way the voltage measured at the output of integrator I. If the "problem check" potentiometer 53 associated with each integrator is adjusted to the problem initial condition voltage of its respective integrator, the voltages which appear at each integrator output terminal will equal the respective initial derivative signals which will be applied to the integrators when the problem is run. In the situation where a first order loop exists around a given integrator, which is the only situation where the known voltage from the potentiometer 53 passes through the loop to determine the integrator output, it will be seen that the voltage translated through the first order loop will equal the initial derivative only if the integrator has but a single input, and that where the integrator is connected to receive several inputs the signal passed through the first order loop will comprise only a portion of the initial derivative measured at the amplifier output terminal 46, and that other inputs to the integrator contribute other portions or components of the initial derivative. The other inputs may originate from the initial condition voltages at other integrators and from a variety of other sources, and each other such input will be seen to comprise a branch input to the opened first order loop. Where the integrator initial condition value is set on the substituted potentiometer 53 associated with the integrator in a first order loop, it will be seen that the initial derivative which is measured is always dependent upon the integrator initial condition value. Because the nature of the remainder of the first order loop indicated by block 9 will vary widely from one problem to another, the loading on potentiometer 53 varies widely, tending to require a very low impedance potentiometer at 53, or one capable of supplying considerable current. The system of the present invention completely eliminates the need for potentiometer 53.

Figure 2B:
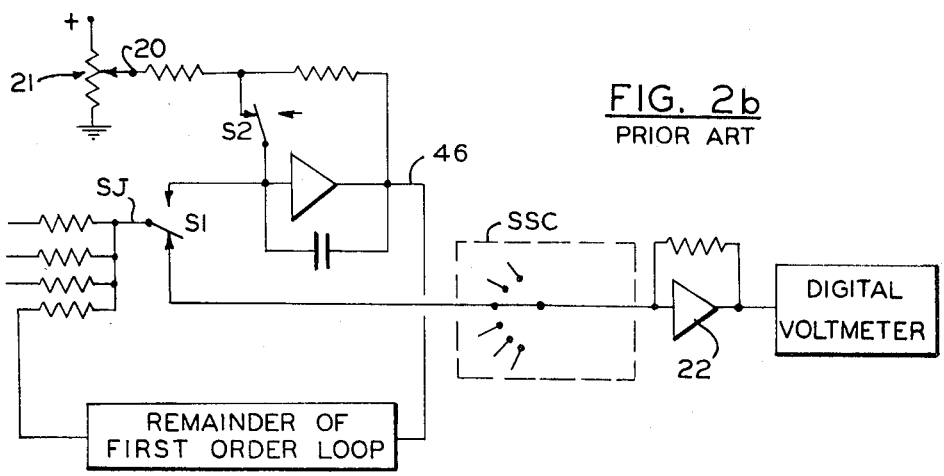
FIG. 2b is a schematic diagram illustrating the configuration of each integrator and its connection to a measuring instrument in a second prior art testing system when a static check is being performed.

Another prior art checking arrangement illustrated in connection with FIG. 2b also avoids the use of potentiometer 53 of FIG. 2a but involves other problems. The checking procedure illustrated by the system of FIG. 2b essentially involves switching all integrators to the "reset" or initial condition mode (often called the IC mode) shown in FIG. 2b, by opening "hold" switch S1 as shown to disconnect the input signals from the integrator amplifier, and by closing switch S2 as shown, so that the integrator output voltage becomes equal and opposite to the voltage applied to the integrator initial condition or "IC" terminal 20 by initial condition potentiometer 21. Thus, as in the case of FIG. 2a, each integrator is in a standby mode wherein it provides a steady or fixed output signal. The current appearing at the integrator summing junction SJ is then measured using a separate operational amplifier 22 which provides an output voltage. Amplifier 22 ordinarily is used to address the various integrator summing junctions in succession, using a selective switching circuit or address selector SSC. As successive integrator summing junctions are addressed, all integrators remain in a standby mode, such as the "IC" or reset mode. Selective switching circuit SSC ordinarily may be operated to address a variety of terminals other than integrator summing junctions, such as all amplifier output terminals, for example. In most general-purpose analog computers, many of the operational amplifiers can be operated either as summing amplifiers (by connecting a feedback resistance around them) or as integrators (by connecting a feedback capacitor around them). While only a few of the operational amplifiers may be used as integrators in a given problem, the system of FIG. 2b requires that the addressing circuit SSC be capable of addressing any amplifier which is capable of being operated as an integrator. The cost of any selective switching or addressing system ordinarily increases rapidly as the number of terminals which it is built to be capable of addressing is increased. Because the prior art system of FIG. 2b requires that integrator summing junctions be addressed, the addressing circuitry SSC used with it must be considerably more expensive than that used with the present invention, wherein there is no need to address any integrator summing junction in order to check the problem connections. The arrangement of FIG. 2b also results in the applied initial condition voltage being passed through a first order loop back to the integrator summing junction, and in it not being returned through any second order or higher order loop to the summing junction. Similarly, where an integrator in a first order loop has only a single input, the signal passed through the loop will comprise the initial derivative, but if the integrator has more than one input signal the signal passed through the first order loop will comprise only a component or part of the initial derivative. Also, the initial derivative which is measured at a given integrator in a first order loop will be seen to depend upon the initial condition voltage applied to that integrator. If the initial condition voltage is zero, measurement of the zero-voltage integrator output obviously does not verify the input connections to the integrator. Some prior art computers have incorporated a second initial condition potentiometer similar to potentiometer 21 with each integrator, with a relay to connect the second potentiometer to terminal 20 in lieu of potentiometer 21 when a "false IC" bus (not shown) is energized. The second, or false IC potentiometers, can be set to problem values other than initial values, so that nonzero outputs result from each integrator even though various of the actual problem initial conditions are zero. Each integrator of a computer is ordinarily provided with a plurality (e.g. 4 or 5) capacitors of different size, with means to select a given one to function as capacitor 40, which together with the integrator input resistance, determines the integrator time-constant. It also may be seen that neither of the above-described prior art testing schemes provides any dynamic testing to verify whether or not a given integrator circuit has the correct integrating time-constant, and for that reason, it has been necessary or desirable in the prior art to provide additional equipment for dynamic testing, such as timing devices which operate a given integrator for a measured time interval, after which its output voltage is measured. The present invention obviates the need for such additional equipment. Because most time-scale errors which occur during problem patching occur because of selection of the wrong size of capacitor, and because the sizes of successive capacitors ordinarily differ by a large factor, such as 10, for example, most time-scaling errors may be readily detected by mere observation of the order of magnitude of the time-constant, without a need for measuring the precise value of the time constant.

The checking arrangement of the present invention differs markedly from the mentioned prior systems in that measurements are made on first order loops which are closed rather than opened, also in that the value measured at a given integrator in a first order loop is not the initial derivative, and thirdly in that the measured steady-state value in no way depends upon the initial condition of the given integrator. Furthermore, as will be seen below, all of the integrators in the present invention do not remain in a standby mode as their outputs are successively measured as in the case of the mentioned prior art, but instead, individual ones of the integrators are switched from a standby mode to a checking mode while their outputs are monitored. As shown below, each integrator may be switched while its output is being monitored, from a reset or IC standby mode to a checking mode in which the integrator operates as a first order lag circuit. Because a measurable output voltage occurs at every integrator of the problem even though the problem initial condition value for various of the integrators may be zero, the computer of the present invention does not require a second false IC potentiometer with every integrator, nor does it need the relays or false IC bus wiring in order to completely check the computer. In accordance with the present invention, all integrators are placed in reset or IC configurations and then successively addressed to monitor their outputs, but as a given integrator output terminal is addressed, its input signals are applied to its amplified and a feedback resistor is connected across its capacitor to convert the integrator to a lag summer, but all other integrators included in the problem then remain in a reset configuration. During the period when a given integrator is addressed, its output voltage changes exponentially from the integrator initial condition value to a final steady-state value. By comparing the steady-state value with a precalculated value, the operator can determine whether all of the input signals to the integrator summing junction are properly connected and adjusted. By observing the initially monitored value the operator can determine whether the initial condition input to the integrator is proper. By observing the rate of change of the integrator output signal as it is monitored, the operator can gain an insight into the time constants associated with the integrator and can detect various time-scale errors.

Figure 3:
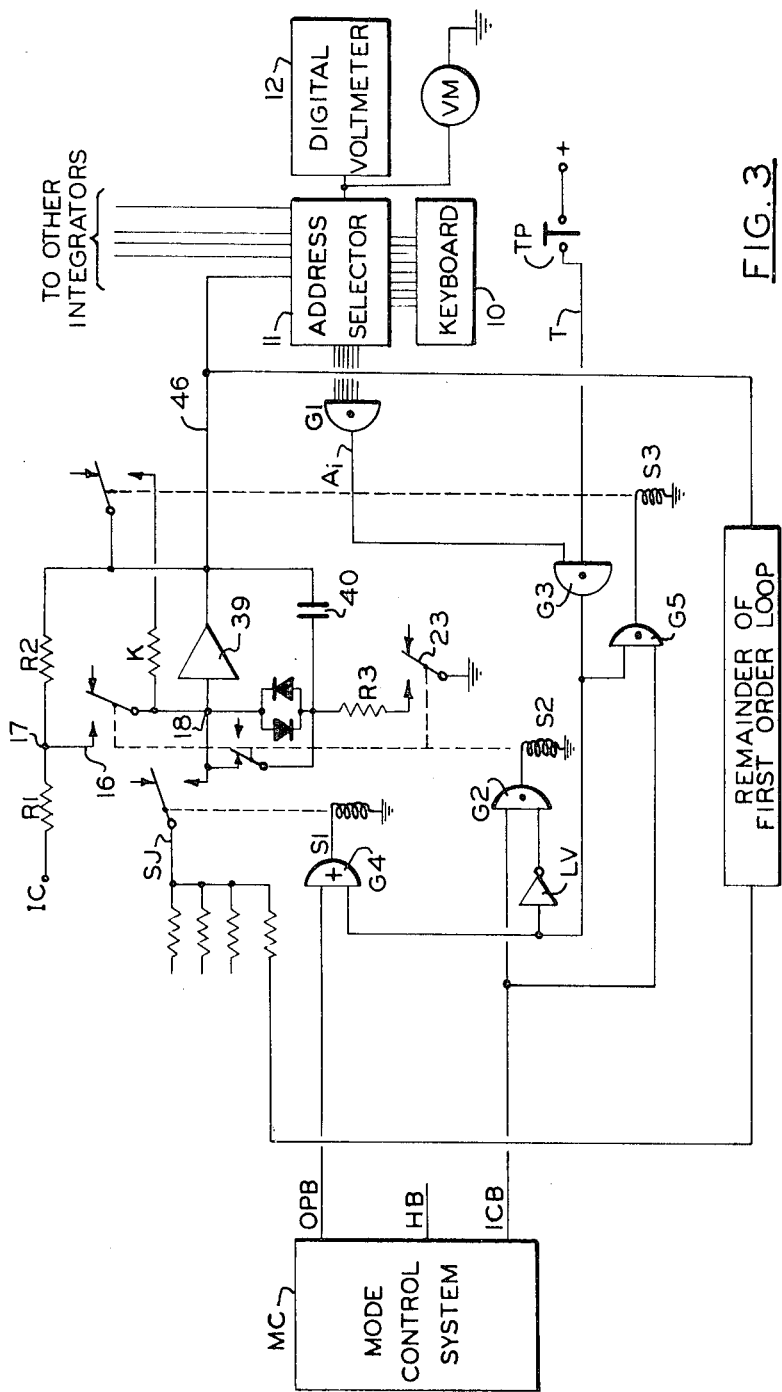
FIG. 3 is a schematic diagram illustrating one form of integrator circuit control in accordance with the present invention. As will be seen below, when a given integrator in the system of the present invention is being monitored in the manner shown in FIG. 3, all of the other integrators in the computer problem are placed in a configuration similar to that of the integrator of FIG. 2b.

FIG. 3 illustrates an integrator connected to be controlled in accordance with the present invention. All of the amplifiers in the computer which are sometimes used as integrators may be connected similarly. While one integrator is being monitored, all other integrators remain in their "IC" or "reset" mode. The computer includes a conventional keyboard 10 by means of which the operator can address any one of a large number of computer components so as to monitor the voltage or the current at a desired terminal. The keyboard applies a multibit digital signal to a switching matrix or address selector 11. Address selector systems commonly are arranged so that voltages from potentiometers and the voltage on the output line of any amplifier may be monitored, and so that the current at any amplifier summing junction may be monitored. As mentioned above, the invention offers significant economies because the address selector used with the invention need not be capable of addressing amplifier summing junctions. When the operator addresses the integrator of FIG. 3, AND-gate G1 is enabled to provide a logic 1 signal $A_i$. Operation of keyboard 10 to address a different integrator amplifier provides a similar signal at the different integrator amplifiers.

In order to check out a problem setup in accordance with the method of the present invention, after the patchboard has been installed with the problem patched, the computer is initially put in its IC or reset mode. The computer includes a conventional mode control system indicated by block MC which energizes one of three busses OPB, HB, or ICB when the computer is switched to either its "Operate," its "Hold," or its "Initial Condition" mode, respectively. The proper one of the three busses may be energized manually by operator depression of one of three interlocked pushbuttons, and in some computers various control signals from other devices can be arranged to control the computer mode. When the computer is placed in the IC or reset mode, the logic 1 signal on bus ICB, together with a logic 1 signal from logic inverter LV enable And-gate gate G2, thereby energizing relay S2. Closure of contact 16 of relay S2 connects terminal 17 to the amplifier input terminal 18, thereby driving the amplifier until its output voltage equals $-E_{IC}R2/R1$ (where $E_{IC}$ is the voltage applied to the integrator IC terminal, and R2 and R1 are the resistances of resistors R2 and R1), and thereby charging capacitor 40 to that voltage. While various other integrator reset circuits may be used without departing from the invention, FIG. 3 is shown including the improved reset circuit of copending application Ser. No. 627,181 filed Mar. 30, 1967 by Edward O. Gilbert and Elmer G. Gilbert, now Pat. No. 3,503,049, issued Mar. 14, 1970 and assigned to the assignee of the present invention. During the reset mode contact 23 of relay S2 connects capacitor 40 to ground through a small current-measuring resistance R3, which measures the current through capacitor 40, and the contact of switch S2 connected in parallel with the diodes shown in FIG. 3 is open. When the voltage across R3 exceeds the forward contact potential of one of the diodes shown, negative feedback is applied to terminal 18 to limit the output current of amplifier 39 to a safe value. Resistors R2 and R1 are ordinarily made equal, so that the output voltage of amplifier 39 is driven to a steady-state value which is equal in magnitude and opposite in sign to the voltage applied to the integrator terminal IC. Thus putting the computer into the reset mode provides $-E_{IC}$ voltages at the output lines of all of the integrators to which nonzero initial condition voltages have been connected. Then the address selector is used to address the outputs of many of the components to determine that various branches of the problem are correctly patched and adjusted. In the hypothetical problem of FIG. 1, for example, the outputs from various components fed by the four integrator output lines first may be monitored. For example, the output of potentiometer D connected as an input to integrator I1 should equal $-100dl$, where $l$ is the setting of initial condition potentiometer L and $d$ is the setting of potentiometer D, the output of potentiometer C should equal $-100cl$, and that of potentiometer E should equal $-100el$, etc. By use of this conventional IC testing it will be seen that one can check the connections and adjustments of all computing components connected to those integrators which have nonzero initial conditions, but that the procedure does not check branches connected to integrators having zero voltage initial conditions, and does not check the connections to the integrator input circuits.

In accordance with the invention, the outputs of the integrators are then monitored in succession. After the operator addresses a given integrator output line to enable the address Line $A_i$ of that particular integrator, he depresses a test pushbutton switch TP to replace a logic 1 signal on line T, which extends to all integrators within the computer. Assuming that the address of the integrator shown in FIG. 3 is $A_i$, the entry of that address into the address selector and subsequent operator depression of the test pushbutton will be seen to enable AND-gate G3. The logic 1 signal from G3 is inverted by logic inverter LV, thereby disabling gate G2 and deenergizing relay S2 of the addressed integrator. The logic 1 signal from gate G3 also passes through OR-gate G4 to energize relay S1, and is also applied to AND-gate G5 to energize relay S3. Energization of switch S1 will be seen to connect the integrator summing junction SJ to the input circuit of the integrator amplifier 39, thereby completing or closing (through block 9) any first order problem loop which includes the integrator. Energization of relay S3 will be seen to connect feedback resistance K between the output and input terminals of integrator amplifier 39, in parallel with integrator capacitor 40, thereby connecting the integrator as a lag summer. At the instant the operator first depresses the test pushbutton, the output of the integrator being monitored will be equal in magnitude and opposite in sign to the voltage which is applied to its respective IC terminal. However, the output voltage of the integrator immediately begins to change exponentially to a new value which is dependent upon the input connections to the integrator. Unlike prior arrangements, the new value will not be the initial derivative if the integrator is connected in a loop, and the new value will not depend upon the initial condition voltage applied to the integrator being monitored.

Assume, for example, that integrator I3 of FIG. 1 is to be monitored. Prior to depression of test pushbutton, the output voltage from integrator I3 during its standby or reset mode will equal $-100n$ where $n$ is the setting of potentiometer N. Upon depression of the test pushbutton switch integrator I3 into its checking mode the initial condition signal from potentiometer N becomes ineffective, and inputs are applied to the integrator from potentiometers E,F,G and H, and the output of integrator I3 is applied to the input via its internal resistor corresponding to resistor K in FIG. 3. An equation summing the inputs to the amplifier of integrator I3 and expressing the steady-state voltage value $V_3$ to which the integrator I3 output exponentially changes during its checking mode may be written as follows by merely listing the steady-state inputs which are applied to the integrator amplified during the test period:

$$-100\ el + 100mf + 100g + V_3 h + V_3 k = 0 \quad (1)$$

or $$V_3 = \frac{-le + mf + g}{h + k} \times 100 \quad (1a)$$

By way of contrast, it may be noted that the initial derivative value which prior art arrangements would measure is, instead:

$$V_3 = -\frac{-le + mf + g + nh}{k_1} \times 100 \quad (2)$$

where $k_1$ is the conductance of resistor 41 in FIG. 2a, for example.

When integrator I1 is tested using the new system, its $V_1$ output voltage value will be seen to change exponentially from a value of $-100\ l$ to a value $$V_1 = -\frac{-b - an}{d + k} \times 100 \quad (3)$$

while the initial derivative measured by a prior art system would instead equal:

$$V_1 = -\frac{-b - an + ld}{k_1} \times 100 \quad (4)$$

The outputs of integrators which are connected in branch circuits rather than in first order loops also may be monitored. The output of integrator I4 in FIG. 1 will change exponentially from a value of $-100p$ to a value of $$-\frac{k_2 - nj}{k} \times 100$$

as integrator I4 is monitored. The initial derivative value which would be measured using any one of the prior art arrangements would be $$-\frac{k_2 - nj}{k_1} \times 100.$$

. It will be seen from the last above example, that the steady-state value measured in accordance with the invention will be proportional to the initial derivative only in the case of integrators which are not included in first order loops. Measuring the integrator output and comparing it with a value calculated in the manner of expression (1) will be seen to completely check whether all of the inputs to the integrator summing junction are properly connected and adjusted. It will be apparent from expressions (1a) and (3) that the magnitude of the steady-state output voltage measured from a given integrator as it is connected as a lag summer varies as a function of the resistance of resistor K, as well as with the gain of the remainder of the loop apparatus indicated by block 9. In one actual embodiment of the invention, the resistor K provided in each integrator was 10,000 ohms, where the normal output voltage operating range of each amplifier was ±10 volts. When test pushbutton switch TP, which is preferably a momentary pushbutton, is released, the output voltage of the integrator being monitored will change from the lag summer steady-state value back to the initial condition value, and that change also may be observed by the operator if desired. If the particular fast reset circuit shown is used, the change back to the initial condition value will be extremely rapid, with reset occurring at substantially the full output current capability of amplifier 39 rather than occurring exponentially. A variety of other well-known integrator reset circuits will provide an exponential change from the lag summer steady-state output value to initial condition value. A most important advantage of the present invention over an arrangement like that of FIG. 2a is that it may be implemented very inexpensively, by provision of a single additional switch and a single resistor at each integrator (switch S3 and resistor K in FIG. 3), inasmuch as all of the other switches shown (or equivalent switches) are already ordinarily provided in such integrators to provide conventional switching between "Operate," "Hold" and "Reset" modes, and then the computer addressing system need not address amplifier summing junctions in order to implement the testing procedure, and integrator time-scaling errors may be detected without the need for auxiliary dynamic checking equipment. It also will be seen that the integrator circuit of the invention shown in FIG. 3 requires no double-throw switches of the types shown in the prior art arrangements of FIGS. 2a and 2b.

In a digital computer-controlled hybrid system the steady-state value which an integrator reaches during its test period or checking mode can be automatically compared with a programmed precalculated value and the checkout program interrupted only when a wrong value occurs. Where automatic means are used to read and compare or record the successive integrator steady-state outputs, it is sometimes important that the program not advance from one integrator output to the next too rapidly. While a given integrator is being monitored its output changes exponentially with time from its initial condition value to its final steady-state value. However, when the address is changed to monitor a second integrator, the output of the given integrator will change back from the steady-state value to its initial condition value, also exponentially with time when various types of slow integrator reset circuits are used, but very rapidly with the reset circuit shown in FIG. 3. If the output of the given integrator provides one of the input signals to the second integrator it will be apparent that the second integrator cannot reach its proper steady-state value until the given integrator is fully reset. Since most integrator circuits ordinarily would have a reset time-constant of about the same order of magnitude as their lag summer time-constant, a previously monitored integrator oridnarily will be fully reset about the same time as the next-monitored integrator reaches its steady-state value. Also, it may be noted that changes in a given integrator input while it is being monitored due to reset of a previously monitored integrator do not in any way affect either the final steady-state value which a monitored integrator reaches or the initial condition value present at the instant when monitoring begins. Furthermore, it may be noted that integrator drift due to capacitor leakage has no appreciable effect on the steady-state value monitored at an integrator.

In an operator-controlled system the output from the integrator being measured may be applied to a voltmeter VM or oscilloscope or plotter in addition to or instead of being applied to a digital voltmeter, since analog indication of the exponentially varying output is more readily interpreted insofar as the dynamics of the problem setup are concerned.

Figure 4:
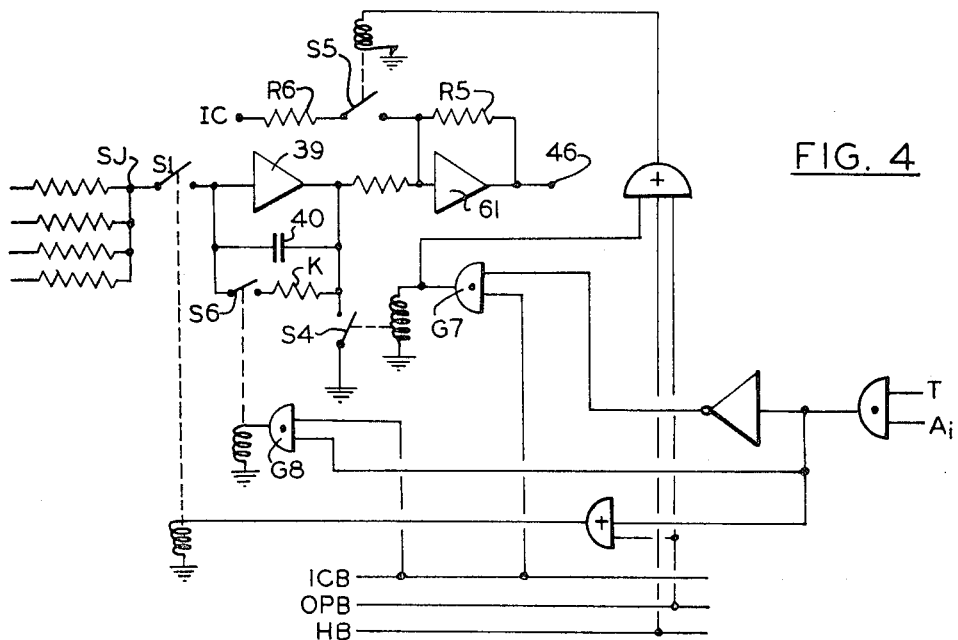
FIG. 4 is a schematic diagram illustrating how the invention may be applied to one different form of electronic integrator circuit.

While the invention has been described thus far in connection with electronic integrators of the type used perhaps universally in the general-purpose analog and hybrid computing arts, the invention is widely applicable to special-purpose computers and other apparatus employing some widely-differing types of integrators. While the integrators shown in FIGS. 2a, 2b and 3 each comprise a single operational amplifier capable of being reset to any desired initial condition, the integrator circuit of a FIG. 4, which is basically a type which has been used in some older computers, comprises a basic integrating circuit (amplifier 39 and capacitor 40) which is capable of being reset only to zero, by closure of switch S4, followed by a summing amplifier (61,R5) which adds the initial condition voltage to the output from amplifier 39 during the "Operate" mode. During the reset or initial condition mode, switches S4 and S5 are closed and switch S1 is open, and a voltage commensurate with the voltage applied to terminal IC appears at output. During the operate mode switches S1 and S5 are closed and switch S4 is open. During a hold mode following an operate mode, switch S5 remains closed and switches S1 and S4 are open. The test and address logic signals T and $A_i$ in FIG. 4 are assumed to be derived in the same manner as in FIG. 3. With the computer in a reset mode, addressing the integrator of FIG. 4 and depressing the test pushbutton to raise line T disable gate G7 to open switches S4 and S5, enables gate G8 to close switch S6, and provides a logic 1 signal via OR-gate gate G9 to close switch S1. With resistor K then connected in parallel with capacitor 40, the opening of switch S5 causes the output voltage monitored on line 46 (in the same manner as in FIG. 3) to immediately drop to zero and then changes exponentially from zero to a steady-state value dependent upon the input signals connected to the integrator summing junction SJ.

As suggested above, the invention is readily applicable to computers in which the integrators use a variety of different reset circuits. In fact, it will become readily apparent to those skilled in the art that the testing system of the invention is not restricted to use with "all-electronic" or "Miller" integrators, but also useful with other integrators which receive electrical inputs and provide electrical outputs, including, for example, velocity servo integrators. Any of the relay switches shown in FIGS. 3 and 4 may comprise an electronic switch, of course, and the functions of the various gates shown in these figures may be performed by many different gate arrangements to achieve equivalent operation.

It will thus be seen that the objects set forth above, among those made apparent from the preceding description, are efficiently attained. Since certain changes may be made in carrying out the above methods and in the constructions set forth without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

We claim:

1. In a computer which includes a plurality of computing components interconnected in one or more closed signal loops during operation of the computer, said components including a plurality of integrators, each of said integrators incorporating first switching means controllable to connect the integrator into a standby mode in which the integrator provides a fixed output signal, said computer including a measuring means, the combination of apparatus for checking the problem setup of said computer, said apparatus for checking comprising a plurality of second switching means, each of said second switching means being connected to a respective one of said integrators and controllable to reconnect its respective integrator from said standby mode in a checking mode in which an input signal is applied to the respective integrator from each of the components which is connected to apply an input signal to the respective integrator during operation of the computer, and in which checking mode a predetermined fraction of the respective integrator output signal is applied degeneratively as an input signal to the respective integrator; and third switching means for connecting said measuring means to measure the output signals of said integrators individually and in succession, said third switching means being operable to control the first switching means of each of said integrators and the second switching means connected to each of said integrators to connect all of the integrators into their standby mode except for the integrator whose output voltage is being measured at a given time, and to connect the integrator whose output is being measured at said given time into its checking mode.

2. Apparatus according to claim 1 in which each of said integrators includes means for receiving a respective initial output value signal and is operative to provide a constant output signal commensurate in magnitude with its respective initial output value signal during said standby mode.

3. Apparatus according to claim 1 in which operation of the second switching means to connect a respective integrator into said checking mode reconnects said integrator into a first order time-constant configuration.

4. Apparatus according to claim 1 in which each of said integrator circuits comprises an operational amplifier having an input terminal and a capacitor connected between said terminals.

5. In a computer which includes a plurality of computing components which are interconnected during operation of the computer in one or more closed signal loops, said plurality of computing components including first and second integrator circuits and said one of said closed loops including said first integrator circuit; said computer including first switching means for switching said first and second integrator circuits to a standby condition in which each of said integrator circuits provides a respective constant value of output voltage the combination of apparatus for checking the problem setup of said computer, said apparatus including second switching means for reconnecting said first integrator circuit from said standby condition into a lag circuit configuration; and means connected to monitor the output of said first integrator as the output voltage of said first integrator circuit changes from its constant value to a steady-state value.

6. The combination according to claim 5 in which said computer includes selective interconnection means comprising a patchboard for interconnecting said plurality of computing components.

7. The combination according to claim 5 in which at least one of said integrator circuits includes a terminal adapted to receive an initial condition signal, one of said computing components is connected to apply a voltage to said terminal, and said one of said integrator circuits is operative during said standby condition to provide a constant value of output voltage which is commensurate with the voltage applied to said terminal.

8. The combination according to claim 5 in which said first integrator circuit comprises an operational amplifier having an input terminal, an output terminal and a capacitor connected between said terminals; said second switching means including means for connecting a resistance between said terminals and means for applying an input signal from at least one of said computing components to said input terminal.

9. a computer having a plurality of computing components interconnected during operation of the computer, said computing components including at least one integrator having an integrand input signal circuit and an initial condition input signal circuit, a plurality of others of said computing components being connected to apply input signals to said integrand input signal circuit during operation of the computer and a further one of said computing components being connected to apply a signal to said initial condition input signal circuit, said integrator including first switching means operable to connect said integrator into a reset mode wherein the input signals to said integrand input signal circuit do not affect the output signal of said integrator and wherein the output signal of said integrator is established by the signal applied to said initial condition input signal circuit, and wherein said computer includes measuring means and means for selectively connecting said measuring means to measure the output signal of a desired one of said integrators; the combination of second switching means operable to connect said integrator into a checking mode wherein said integrator is converted into a lag circuit to receive the signals connected to said integrand input signal circuit; and means for operating said second switching means, whereby upon operation of said second switching means to switch said integrator from its reset mode into its checking mode causes the signal measured by said measuring means to change from the value established by the signal applied to said initial condition input circuit to a steady-state value which is independent of the value of the signal applied to said initial condition input circuit.

10. The method of testing the problem setup of a computer having a plurality of computing components which are interconnected during operation of the computer and which include a plurality of integrators connected to receive input signals, comprising the steps of switching all of said integrators to a standby mode wherein each of said integrators provides a respective constant output signal, and then successively measuring the output signals of said integrators while reconnecting only the integrator whose output signal is being measured at a given time as a lag circuit driven by its respective input signals.

* * * * *